US011317285B2

(12) United States Patent
Neipris et al.

(10) Patent No.: US 11,317,285 B2
(45) Date of Patent: Apr. 26, 2022

(54) WIRELESS NETWORK PROVISIONING USING A PRE-SHARED KEY

(71) Applicant: DISH Network L.L.C., Englewood, CO (US)

(72) Inventors: Edward W. Neipris, Wrentham, MA (US); Joshua David Wade, Castle Rock, CO (US); Tyler Nesper, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/028,401

(22) Filed: Sep. 22, 2020

(65) Prior Publication Data

US 2021/0099876 A1 Apr. 1, 2021

Related U.S. Application Data

(60) Provisional application No. 62/986,255, filed on Mar. 6, 2020, provisional application No. 62/908,221, filed on Sep. 30, 2019.

(51) Int. Cl.
*H04L 29/06* (2006.01)
*H04W 12/069* (2021.01)
*H04W 4/50* (2018.01)
*H04W 12/106* (2021.01)
*H04W 84/12* (2009.01)

(52) U.S. Cl.
CPC .......... *H04W 12/069* (2021.01); *H04W 4/50* (2018.02); *H04W 12/106* (2021.01); *H04W 84/12* (2013.01)

(58) Field of Classification Search
CPC  H04W 12/0609; H04W 4/50; H04W 12/1006
USPC .............................................. 726/6
See application file for complete search history.

(56) References Cited

U.S. PATENT DOCUMENTS 10,230,522 B1 * 3/2019 Roths .................... H04W 76/10
11,166,157 B2    11/2021 Olshansky et al.
(Continued)

OTHER PUBLICATIONS

Keoh,"Securing the Internet of Things: A Standardization Perspective", 2014, IEEE, pp. 1-12 (Year: 2014).*
(Continued)

*Primary Examiner* — Taghi T Arani
*Assistant Examiner* — Gregory A Lane
(74) *Attorney, Agent, or Firm* — Kilpatrick Townsend & Stockton LLP

(57) ABSTRACT

Various arrangements for wireless network provisioning using a pre-shared key (PSK) are presented. A plurality of wireless network access profiles that indicate a plurality of PSKs may be stored. An access point may receive, from a wireless device, a first value based at on the PSK. The access point can transmit the first value to a cloud-based provisioning system. A plurality of values based on the plurality of PSKs of the plurality of wireless network access profiles may be created and a match between a second value of the plurality of values and the transmitted first value may be identified. A third value may be provided to the access point based on the PSK of the wireless network access profile of the plurality of wireless network access profiles used to generate the value. Network access can then be granted based on the third value.

18 Claims, 5 Drawing Sheets

(56) References Cited

U.S. PATENT DOCUMENTS

| | | | |
|---|---|---|---|
| 2011/0088078 A1* | 4/2011 | Kholaif | H04W 48/16 726/3 |
| 2011/0243553 A1* | 10/2011 | Russell | H04L 67/306 398/25 |
| 2013/0132578 A1* | 5/2013 | Raleigh | H04L 41/5054 709/225 |
| 2017/0070390 A1* | 3/2017 | Poola | H04L 63/0876 |
| 2017/0070881 A1* | 3/2017 | Sun | H04L 63/061 |
| 2017/0230824 A1* | 8/2017 | Li | H04L 63/123 |
| 2019/0028892 A1 | 1/2019 | Henry et al. | |
| 2019/0313246 A1* | 10/2019 | Nix | H04L 9/3263 |

OTHER PUBLICATIONS

International Search Report and Written Opinion for PCT/US2020/052114 dated Nov. 13, 2020, all pages.

\* cited by examiner

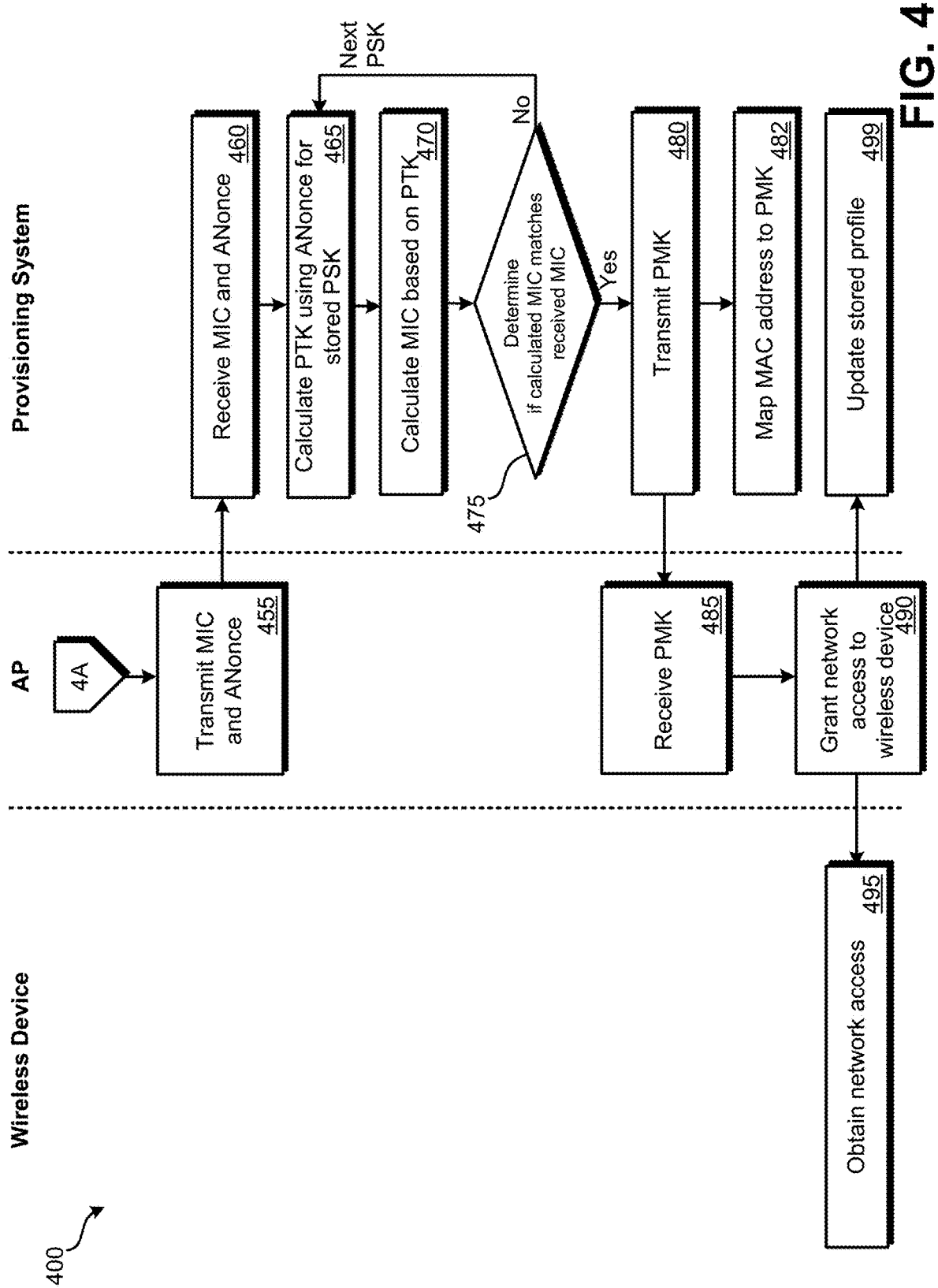

WIRELESS NETWORK PROVISIONING USING A PRE-SHARED KEY

CROSS-REFERENCES TO RELATED APPLICATIONS

This application claims priority to U.S. Provisional Patent Application No. 62/908,221, filed on Sep. 30, 2019, entitled "Wireless Network Provisioning using a Pre-Shared Key," and U.S. Provisional Patent Application No. 62/986,255, filed on Mar. 6, 2020, entitled "Wireless Network Provisioning using a Pre-Shared Key," the entire disclosures of which are hereby incorporated by reference for all purposes.

BACKGROUND

Enabling a wireless device for wireless network access can present challenges. Only some wireless devices may be able to perform a certificate-based arrangement, such as Hotspot 2.0. As another option, 802.1x Extensible Authentication Protocol (EAP) may allow for a user to supply credentials via the wireless device once connected with the wireless network. However, this arrangement may not be possible if the wireless device attempting to connect to the wireless network does not have a user interface that can be used to present such a request and gather user credentials. For example, many Internet-of-Things (IoT) devices, such as sensor devices, may not have a user interface that would be sufficient for a user to efficiently input such credentials.

In a conventional pre-shared key (PSK) arrangement, such as for a home Wi-Fi network, a user may perform an initial configuration of an access point (AP) such as a wireless router. The user may create a PSK, such as a string of characters that the user can readily remember or otherwise store (e.g., write down), and provide the PSK to the AP. For wireless devices that the user desires to have connected with the wireless network, the user may input or select the SSID of the wireless network created by the AP and input the PSK. Based upon encrypted communications between the AP and the wireless device, a determination can be made as to whether the PSK provided to the wireless device matches the PSK stored by the AP without directly transmitting the PSK.

However, many situations exist where it could be detrimental to have a same PSK used across wireless devices associated with different users' devices. For instance, an apartment complex or hotel may have a shared wireless network. If multiple users all use the same PSK, it may be possible for one user's device to intercept and decode another user's device's communications with the wireless network. Further, limiting access to the wireless network for users that have already received the PSK may be cumbersome, such as after a previously-authorized user has checked out of a hotel or otherwise needs to be restricted from accessing the wireless network. In such a situation, an administrator may need to manually whitelist or blacklist individual MAC addresses that are permitted to access the wireless network or are blocked from accessing the wireless network, respectively.

SUMMARY

Various arrangements for wireless network provisioning using a pre-shared key (PSK) may be presented. In some embodiments, methods wireless network provisioning using a pre-shared key (PSK) may be presented. A plurality of wireless network access profiles may be created that indicate a plurality of PSKs. An access point may receive from a wireless device a first value that is based at least in part on the PSK. The access point may transmit the first value to the cloud-based provisioning system. The cloud-based provisioning system may create a plurality of values based on the plurality of PSKs of the plurality of wireless network access profiles. The cloud-based provisioning system may identify a second value of the plurality of values that matches the transmitted first value. A third value may be provided based on the PSK of the wireless network access profile of the plurality of wireless network access profiles used to generate the value. Network access may be provided to the wireless device based on the third value.

Embodiments of such a method may include one or more of the following features: The third value may be a PMK. Internet access may be granted to the wireless device during a time period defined by the wireless network access profile. The first value may be a message integrity code (MIC). The access point may transmit an ANonce value and an SNonce value to the cloud-based provisioning system. The access point may transmit a MAC address for the wireless device to the cloud-based provisioning system. The PSK may never be transmitted between the wireless device and the access point. Based on the wireless network access profile the cloud-based provisioning system may determine that the wireless device is the first wireless device to access the wireless network using the PSK. Terms of service may be provided to the wireless device for presentation based on determining that the wireless device is the first wireless device to access the wireless network using the PSK. A unique identifier may be requested from the wireless device. The unique identifier may be received from the wireless device. The cloud-based provisioning system may compare the unique identifier to a stored unique identifier that is part of the wireless network access profile, wherein providing Internet access is conditional on the unique identifier matching the stored unique identifier.

In some embodiments, a system is presented. The system may be for wireless network provisioning using a pre-shared key (PSK). The system can include an access point that provides wireless devices with Internet access and is configured to receive a first value from a wireless device that is based at least in part on a PSK. The system can include a cloud-based provisioning system that communicates with the access point, the cloud-based provisioning system. The cloud-based provisioning system may create a plurality of wireless network access profiles that indicate a plurality of PSKs. The cloud-based provisioning system may receive the first value from the access point. The cloud-based provisioning system may create a plurality of values based on the plurality of PSKs of the plurality of wireless network access profiles. The cloud-based provisioning system may identify a second value of the plurality of values that matches the received first value. The cloud-based provisioning system may transmit, to the access point, a third value based on the PSK of the wireless network access profile of the plurality of wireless network access profiles used to generate the value.

Embodiments of such a system may include one or more of the following features: The access point may be configured to provide network access based on the third value. The third value may be a PMK. Internet access may be granted to the wireless device during a time period defined by the wireless network access profile. The first value may be a message integrity code (MIC). The access point may be further configured to transmit an ANonce value and an SNonce value to the cloud-based provisioning system, wherein the SNonce value is received by the access point from the wireless device. The system may include the wireless device. The system may include a second access point that provides wireless devices with Internet access. The PSK may never transmitted between the wireless device and the access point. The cloud-based provisioning system may be further configured to determine, based on the wireless network access profile, that the wireless device is the first wireless device to access the wireless network is association with the wireless network access profile. The cloud-based provisioning system may be further configured to provide, via the access point, terms of service to the wireless device for presentation based on determining that the wireless device is the first wireless device to access the wireless network in association with the wireless network access profile. The cloud-based provisioning system may be further configured to request, via the access point, a unique identifier from the wireless device. The cloud-based provisioning system may be further configured to receive, via the access point, the unique identifier from the wireless device. The cloud-based provisioning system may be further configured to compare the unique identifier to a stored unique identifier that is part of the wireless network access profile, wherein providing Internet access is conditional on the unique identifier matching the stored unique identifier.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 4A and 4B illustrate another embodiment of a method for wireless network provisioning using a pre-shared key.

DETAILED DESCRIPTION

Detailed herein are embodiments that allow for centrally-controlled wireless network access based on unique pre-shared keys (PSKs). Similar to a conventional Wi-Fi network, a user can select a wireless network based on the wireless network's SSID and input a PSK. In the embodiments detailed herein, the PSK can be particular to a user (or group of users) and can have been provided to the user separately (e.g., in a registration email, via text message, orally, on paper, etc.) to the user. Data based at least on part on the PSK is passed by an access point (AP) to a remote cloud-based provisioning system via a network. The cloud-based provisioning system can determine if a wireless network access profile is stored that is mapped to the received data based on the PSK. If so, data from the wireless network access profile is passed to the AP and used to grant network access to the wireless device that provided data based on the PSK.

Figure 1:
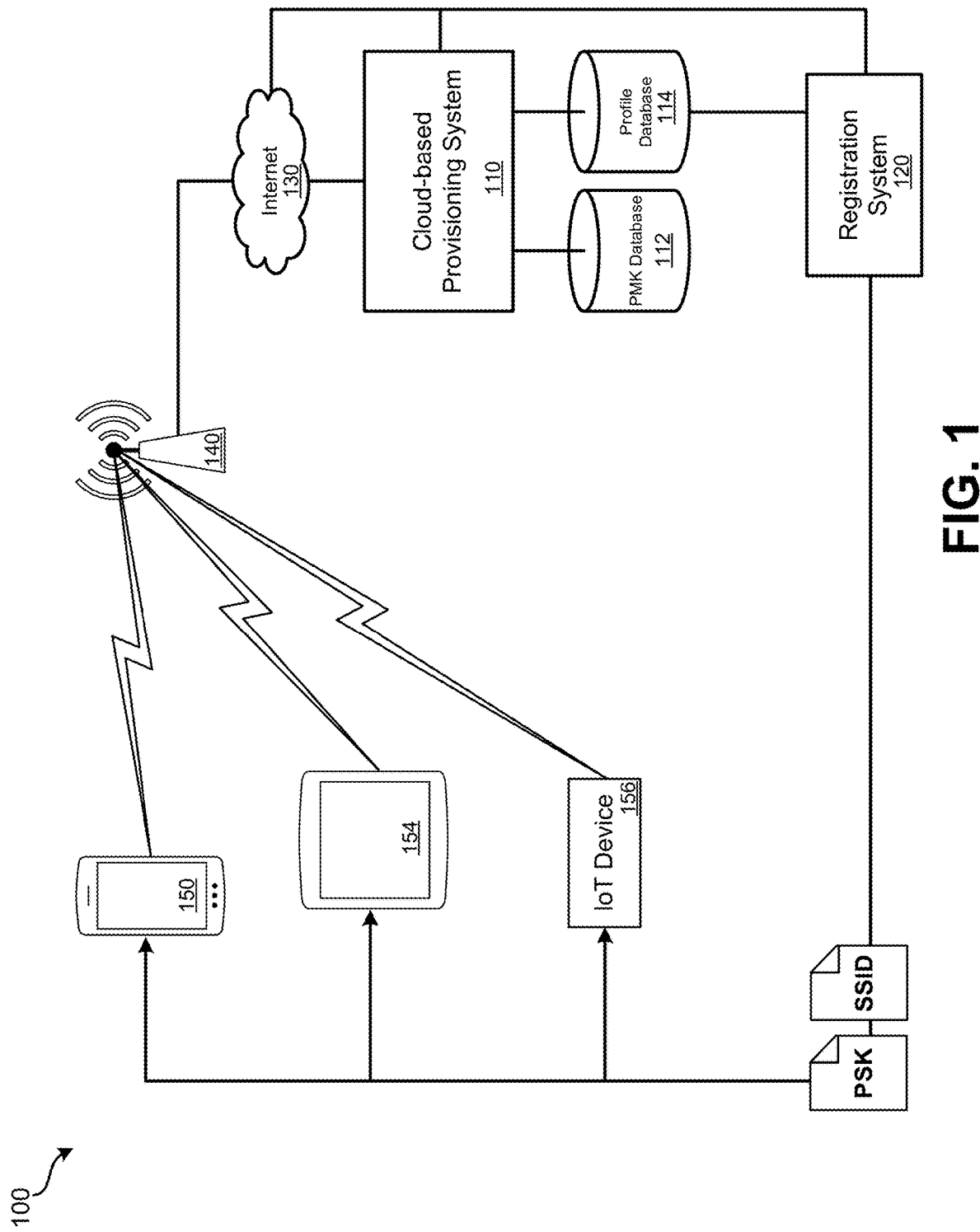
FIG. 1 illustrates an embodiment of a wireless pre-shared key provisioning system.

Further detail regarding such embodiments and additional embodiments are detailed in relation to the figures. FIG. 1 illustrates an embodiment of a wireless pre-shared key provisioning system 100 ("system 100"). System 100 can include: cloud-based provisioning system 110; PMK (Pairwise Master Key) database 112; wireless network access profile database 114 ("profile database 114"); registration system 120; Internet 130; access point 140; wireless device 150; wireless device 154; and IoT Device 156.

Registration system 120 can include one or more computer systems and may be operated or configured by an administrator that is tasked with managing access to a wireless network hosted by an AP. When one or more of a user's devices is to be provided access to the wireless network, registration system 120 may be used to generate a unique PSK. In some embodiments, the user may be permitted to define his own PSK or a portion of the PSK (with registration system 120 defining the remainder). The unique PSK may be required to be unique compared to other PSKs used by cloud-based provisioning system 110. The PSK can be provided to only the user or a small group of related users (e.g., residents of a particular apartment, members of a particular travel party). Registration system 120 may be used to transmit a message to the user indicative of the unique PSK, the SSID of the wireless network, a unique identifier associated with the user (e.g., email address, loyalty identifier, patient record number, reservation number, social security number, user-created password, etc.) and/or other details and/or rules that may be pertinent to the user, such as the times and dates during which the user is authorized to access the wireless networks, the bandwidth allocated to the user, access and/or creation of personal area networks (PANs), and access to virtual local area networks (VLANs), etc.

Registration system 120 can transmit the message in many forms to the user. For instance, an email may be transmitted to an email address on record for the user; a text message may be sent to a mobile phone number of the user; a paper letter may addressed and mailed to the user (e.g., as part of a reservation or welcome package for a hotel); a representative or automated system may call (or otherwise talk to) the user (e.g., at hotel check-in), a message may be presented on a display screen for the user to read, a code may be presented for a user to image with his device, an NFC, Bluetooth®, or other short-range data transfer may be performed, etc.

Registration system 120 may be in direct communication with cloud-based provisioning system 110 or may communicate with cloud-based provisioning system 110 via a network, such as Internet 130. Alternatively, registration system 120 and cloud-based provisioning system 110 may function as software-implemented components of a same server system. In some embodiments, registration system 120 can directly access profile database 114.

In addition to the unique PSK being provided to the user, a wireless network access profile may be created in profile database 114 based on the data obtained from registration system 120 to profile database 114. The wireless network access profile can include: the unique PSK, the SSID of the wireless network, the unique identifier associated with the user, rules that may be pertinent to the user (e.g., times and dates during which access to the wireless network is permitted via the wireless network access profile, the amount of bandwidth allocated, access to PANs, access to VLANs), and data relevant to the use of the wireless network access profile (e.g., whether the unique PSK has been used for wireless network access previously).

AP 140 can represent a device that creates a wireless network or serves as a portion of a wireless network through which one or more wireless devices, if properly authorized, can access the Internet and/or some other public or private network. In the illustrated embodiment, a single AP is present. AP 140 may use an IEEE 802.11 suite protocol to communicate with wireless devices. Wi-Fi Protected Access (WPA), such as WPA 1-3, may be used as the security protocol for protecting network communications. It should be understood that embodiments detailed herein may be adapted and used with other communication protocols and security protocols. For example, embodiments detailed herein may be implemented in cellular networks, such as to permit full or limited access to a 3G, 4G, 5G or some other generation cellular network system.

Wireless devices, such as wireless device 150, wireless device 154, and IoT device 156 may generally be any form of computerized device that is capable of communicating with a wireless network. In some embodiments, one or more wired networking devices may also be present. For example, wired networking devices may be connected directly to AP 140 using a cable (e.g., an Ethernet cable). Once access for a wireless device, such as wireless device 150 to the wireless network is granted, the wireless device may also be able to communicate with some or all wired devices connected with the network.

For the example of IoT device 156 (e.g., a sensor device, home automation device), no user interface or a limited user interface may be present. While IoT device 156 may require or benefit from network connectivity, it may be difficult or impossible for a user to perform some forms of network authentication for IoT device 156. In some embodiments, to configure IoT device 156, an application may be executed on another device, such as wireless device 150 or wireless device 152. Through such a device, the user may be able to provide credentials that IoT device 156 can use to perform authentication with AP 140.

Wireless devices 150 and 154 can include smartphones, tablet computers, laptop computers, desktop computers, gaming devices, smart televisions, home assistant devices, smart doorbells, smart smoke detectors, smart carbon monoxide detectors, streaming video cameras, set top boxes (STBs), etc. When a user desires a wireless device, such as wireless device 150 in this example, to initially communicate with a wireless network, the user may input or select the correct SSID and input the unique PSK into wireless device 150 as provided by registration system 120.

Wireless device 150, for example, may perform an initial pairing procedure to determine if the unique PSK grants access to the wireless network created by AP 140. A handshaking procedure, such as the WPA 4-way handshake, may be performed. This arrangement can involve AP 140 transmitting an AP announcement message (ANonce) to wireless device 150. Wireless device 150 can construct a pairwise transient key (PTK) by combining (e.g., concatenating) various attributes, such as: the unique PMK; ANonce; SNonce; the AP MAC address; and the wireless device's MAC address. This combined value may then be processed using a pseudo-random function to generate the final PTK. The PTK can be used to generate a MIC using an HMAC cryptography function that is based on the EAPoL (Extensible Authentication Protocol over LAN) frame, cryptography type, and the PTK. Wireless device 150 may provide a station announcement message (SNonce) and message integrity code (MIC, which can also be referred to as a message authentication code, MAC) to AP 140.

At this point, since AP 140 does not have the unique PSK used by wireless device 150 to construct the PTK, AP 140 transmits the SNonce and MIC received from wireless device, along with any other data needed, such as the EAPoL frame, ANonce, the AP MAC address, and the wireless device's MAC address to cloud-based provisioning system 110 via the Internet 130 (or, additionally or alternatively, some other public and/or private networks or directly).

Cloud-based provisioning system 110 can include one or more computer server systems that communicate with one or more databases stored using non-transitory processor-readable mediums. PMK database 112 can be used to store PMKs that have been created based on the PSKs distributed by registration system 120. To calculate a PMK based on a PSK, a password-based key derivation function may be iterated some number of times, such as 4096 times. The derivation function can use the PSK as the password and the SSID of the wireless network as the salt. By pre-calculating PMKs based on the PSKs and the associated SSIDs, the amount of processing needed to be performing at the time of searching for a match as detailed below can be decreased. Alternatively, PMKs may be calculated on-the-fly using stored PSK and SSID pairs in PMK database 112.

Cloud-based provisioning system 110 can compute the PTK using the received data for all stored PMKs from PMK database 112 or for individual PMKs from PMK database 112 until a match between a calculated MIC and the received MIC is located. The PTK is calculated using the same pseudo-random function used by the AP to compute the PTK. A MIC may then be calculated based on the PTK. A match may be identified when the MIC calculated for the PTK (which, in turn, was calculated based on the PMK obtained from PMK database 112) computed by cloud-based provisioning system matches the MIC received from AP 140. When the calculated MIC matched the MIC received from AP 140, cloud-based provisioning system 110 has determine the correct PMK from PMK database 112 to use to create the PTK. If no MIC match is located, then the PSK input by the user to wireless device 150 is not valid and no access to the wireless network created by AP 140 is provided.

Assuming a MIC match is present, the PSK from PMK database 112 can then be used to perform a look-up in profile database 114. Profile database 114 stores wireless network access profiles. For the PSK, a particular wireless network access profile can be retrieved from profile database 114. Whether access to the wireless network is granted by AP 140 is contingent on the information present in the particular wireless network access profile mapped to the PSK. For instance, the wireless network access profile may include: a permissible time range for access; a permissible date range for access; whitelisted and/or blacklisted MAC addresses; an amount of bandwidth; a total amount of uplink and/or downlink data permissible within a given time period (e.g., one month); permissible or impermissible uses (e.g., no video streaming); whether further authentication is needed, a level of access, which networks are permitted to be accessed, etc.

In some embodiments, data from the wireless network access profile is transmitted via Internet 130 (or some other network) to AP 140 and/or other components of the network. In such embodiments, AP 140 may analyze the contents of the wireless network access profile to determine whether wireless device 150 is to be provided network access. In other embodiments, the determination of whether access is permitted is performed by cloud-based provisioning system 110. In either embodiment, if wireless device 150 is to be provided some amount of access, at minimum, the PMK and/or the PSK that was used to create the PMK that resulted in the calculated MIC matching the received MIC may be transmitted to AP 140. An advantage to transmitting the PMK is that an encryption algorithm may not need to be applied by the AP. AP 140 may use the received PSK to complete the handshake procedure with wireless device 150 and begin communicating. This arrangement results in the PSK never being transmitted, in either an encrypted or unencrypted format, between wireless device 150 and AP 140.

In some embodiments, data stored as part of the wireless network access profile in profile database 114 may be dynamic. For instance, when the PSK associated with the wireless network access profile is used by a wireless device to connect with any AP for the first time, one or more additional steps may be required to be performed. Data within the wireless network access profile may indicate whether or not the PSK has previously been used to connect with an AP for which cloud-based provisioning system 110 manages access. For instance, after communication between wireless device 150 and AP 140 is established using the PSK but before AP 140 permits network access (e.g., access to Internet 130), terms of service may be transmitted to wireless device 150 for presentation to and acknowledgement by a user of wireless device 150. Once the terms of service are assented to and an indication of such is received by AP 140, AP 140 may transmit an indication as such to cloud-based provisioning system 110 to modify the wireless network access profile mapped to the PSK to indicate that the terms of service have been agreed to and do not need to be presented again. In other embodiments, the terms of service may be provided at a different step in the provisioning process. For instance, in some embodiment, in order to receive the PSK and/or SSID, a user may first be required to assent to terms of service.

In some embodiments, in response to a wireless device being successfully granted access to the wireless network, the MAC address (or some other form of identifier of the wireless device) may be stored and mapped to the correct PMK. This mapping may be stored at the AP through which the connection was established, another component of the wireless network, or may be stored by cloud-based provisioning system 110. If the device attempts to reconnect to the wireless network in the future, rather than repeating the entirety of the provisioning process and performing a search through all stored PMKs, the MAC address match may be identified and the associated PMK may first be tested for a match. A general search of stored PMKs may only be performed if no MAC address match is present or the PMK associated with the matching MAC address is not correct. Such an arrangement can significantly reduce the amount of processing needing to be performed to identify a PMK/MIC match.

In some embodiments, additional security beyond the wireless device being used to supply a valid PSK may be desired by the administrator that operates registration system 120. As previously noted, additional information, such as a unique identifier of a user (e.g., email address, password) may be stored as part of a wireless network access profile in profile database 114. After the PSK has been validated, the AP may request that the wireless device supply additional information. For instance, AP 140 may request an email address, loyalty identifier/number, or some other form of unique identifier from a user wireless device 150. A user may then supply the email address (or other form of unique identifier) that was provided during the registration process to registration system 120. Either AP 140 or cloud-based provisioning system 110 may verify whether the provided unique identifier matches the stored unique identifier within the wireless network access profile. If a match is present, network access may be provided. If a match is not present, network access may not be provided and/or the wireless network access profile may be disabled. Depending on the desire of the administrator of registration system 120, such an additional security step may be performed only once for a given wireless network access profile, may be performed each time the wireless device connects to a new AP, and/or for each new wireless device that uses the PSK to connect with an AP for which access is controlled via cloud-based provisioning system 110.

Figure 2:
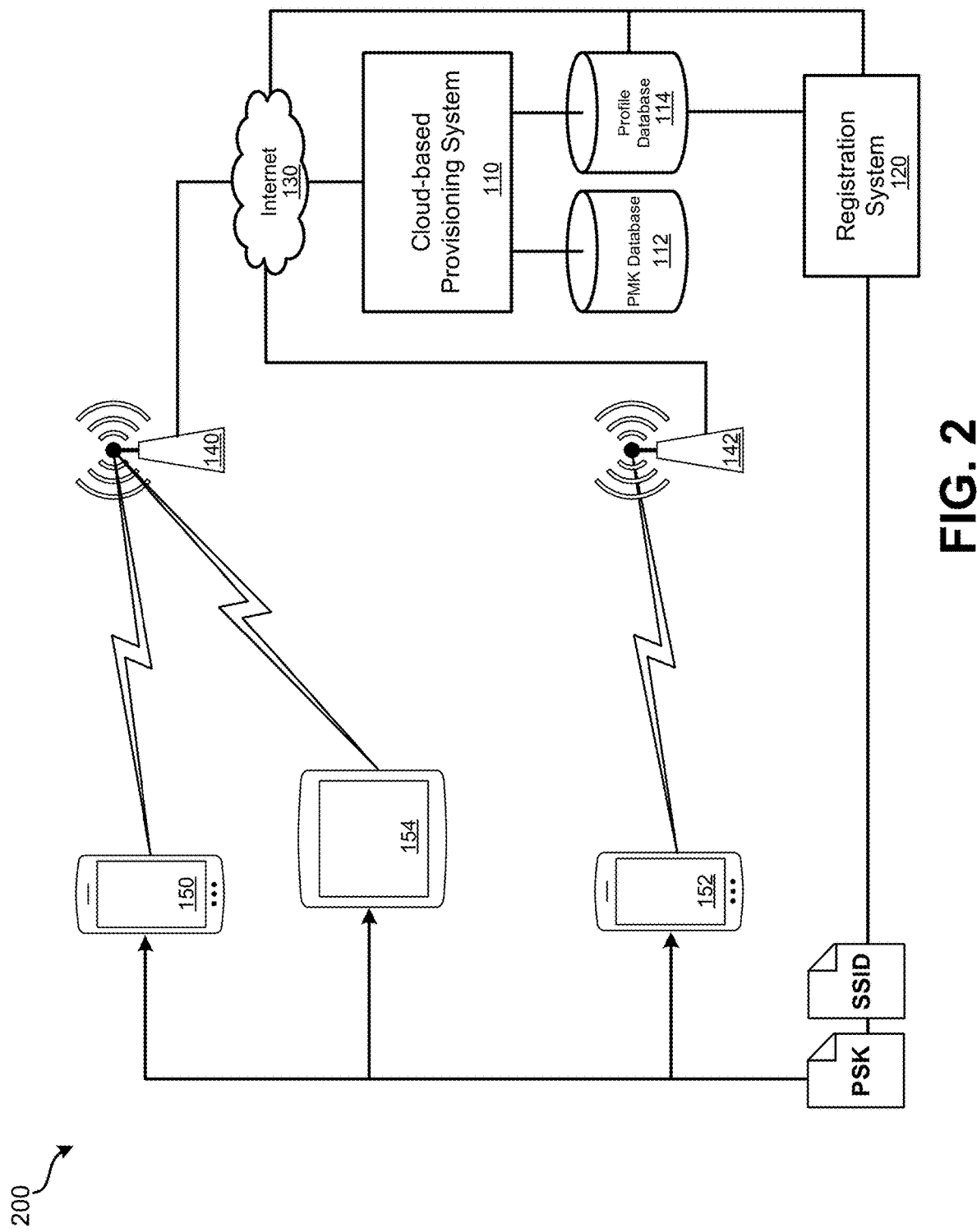
FIG. 2 illustrates another embodiment of a wireless pre-shared key provisioning system.

In the illustrated embodiment of FIG. 1, PMK database 112 and profile database 114 are illustrated as distinct databases. In some embodiments, a single database that stores PMKs and wireless network access profiles may be present. Alternatively, the stored data may be stored across a greater number of databases or other forms of data storage arrangements (e.g., tables). Further, while FIG. 1 and FIG. 2 illustrate cloud-based provisioning system 110 as remotely located from AP 140 and AP 142, in some embodiments, cloud-based provisioning system 110 may be co-located with one or more APs and may communicate without using the Internet. For example, a wired local area network connection may be used.

In some embodiments, rather than a PSK being used to access a single AP, the PSK may be used to access multiple APs, which may be co-located or geographically dispersed. FIG. 2 illustrates another embodiment of a wireless pre-shared key provisioning system 200 ("system 200"). System 200 can function similarly to system 100 of FIG. 1. However, system 200 can include multiple APs, such as: AP 140 and AP 142.

AP 140 and AP 142 may be located in geographically disparate locations or may be approximately co-located. Co-located can refer to APs located in a same building, at a same facility, on a same campus, etc. Disparate locations can refer to different buildings, different hotels, different facilities, etc. For instance, a company may wish for a PSK to provide a user with access to APs across its offices that are scattered across a city, state, country, continent, or the world.

If APs are co-located, as wireless devices move over relatively short distances, such as within a building, the wireless device may switch which AP it communicates with; however, access may remain permitted due to access being managed for both APs by cloud-based provisioning system 110. Similarly, if AP 140 and AP 142 are located in geographically disparate locations, network access can still centrally be managed by cloud-based provisioning system 110. For example, an entity, such as a property rental company, may be able to centrally manage guest access across many properties via cloud-based provisioning system 110.

In some embodiments, AP 140 and AP 142 may represent different base stations of a cellular network. For instance, in a 5G network, gNodeBs may be used in place of APs 140 and 142. Full or partial access may be granted to the cellular network in a similar fashion to a wireless local area network.

If an initial registration process is performed using a first AP, such as when wireless device 152 previously communicated with AP 140, data stored to profile database 114 may indicate that the wireless device has been permitted access. Therefore, when wireless device 152 accesses AP 142, while the back-end process for AP 142 to obtain the correct PSK may need to be repeated, the terms of service (or some other one-time event) would not need to be presented or repeated by wireless device 152 again by virtue of the wireless network access profile stored in profile database 114 indicating that the event has already occurred. Similarly, if the user (or a related used) re-used the PSK on another device, since the same wireless network access profile is used, the terms of service may not need to be presented and assented to.

Figure 3:
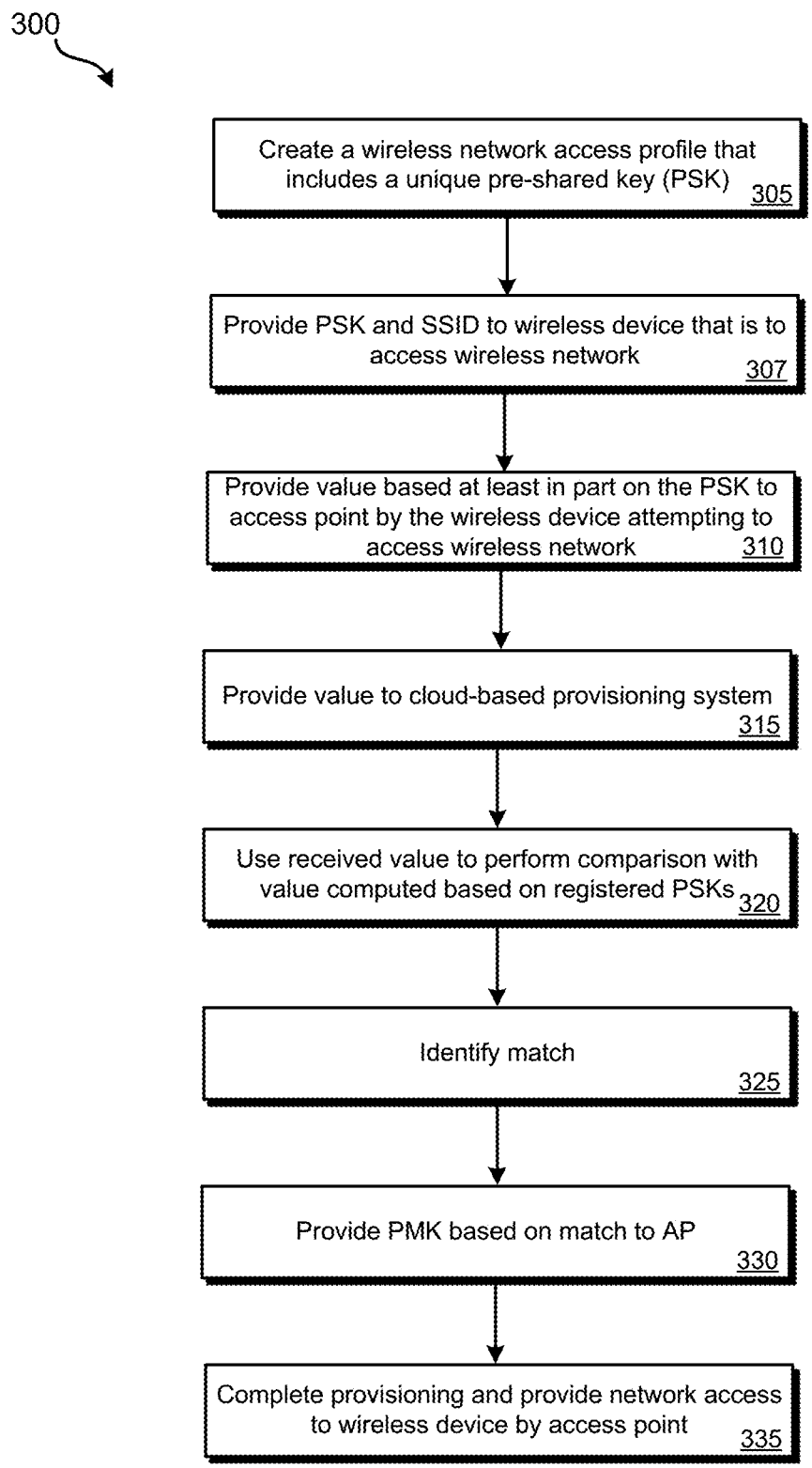
FIG. 3 illustrates an embodiment of a method for wireless network provisioning using a pre-shared key.

Various methods may be performed using the detailed systems of FIGS. 1 and 2. FIG. 3 illustrates an embodiment of a method 300 for wireless network provisioning using a pre-shared key. Method 300 may be performed using system 100, system 200, or some other form of system that allows for wireless network provisioning using a PSK.

At block 305, a wireless network access profile may be created using a unique PSK. The unique PSK may be randomly generated and may be checked to ensure it does not match any other PSK associated with a wireless network access profile. The unique PSK may be created using cloud-based provisioning system 110, registration system 120, or some other computerized component that can access profile database 114. The unique PSK may be created and stored in a profile database of a cloud-based provisioning system. The unique PSK, possible with other pertinent information (e.g., a network SSID), may be provided to a user via any of the arrangements previously disclosed such that the user can input the unique PSK to connect with a wireless network.

In some embodiments, a user may be permitted to create his own PSK and provide it to the cloud-based provisioning system for storage in the profile database. For example, the user may access the cloud-based provisioning system via the web and may be provided with an opportunity to input a desired PSK. In such an embodiment, the user-created PSK may be checked against other PSKs in the profile database to ensure there are no matches with other PSKs assigned to other users. If there is a match, the user may be required to create a different PSK or both the user and the other user that was already mapped with the matching PSK may be required to each create new PSKs before being permitted to access the network. In some embodiments, the cloud-based provisioning system may define a portion of the PSK and the user may define a portion of the PSK. By the cloud-based provisioning system defining a portion of the PSK, any matches with other PSKs in the profile database may be prevented. For example, the cloud-based provisioning system may specify a unique preamble portion of the PSK (that ensures no matches with other PSKs in the profile database) and the user is permitted to define a later portion of the PSK.

At block 307, the unique PSK, possibly along with other information, can be provided to the wireless device that is to access the wireless network. A user may access a network configuration interface and select or input the correct SSID. The user may then be prompted to input the PSK. If the wireless device is an IoT device that does not have a user interface that permits the direct input of data, the user may execute an application on another computerized device or perform some other action to input data on behalf of the IoT device. This other computerized device may transfer the SSID and PSK to the IoT device for use in connecting with the AP.

At block 310, a wireless device can attempt to connect with an AP of the wireless network. The wireless device uses the unique PSK, potentially along with other data (e.g., its MAC address) to generate a value that is transmitted to the AP. In some embodiments, PSK is concatenated with the SNonce, ANonce, AP MAC address, and wireless device MAC address to create a single value. A pseudorandom function may then be applied to generate a PTK. The PTK may then be processed to generate a MIC value. The MIC, an SNonce, and/or the wireless device MAC address may be transmitted to the AP at block 310, such as part of an EAPoL frame, which may also indicate an encryption type. The AP, on receiving the values, may forward the MIC, SNonce, EAPoL frame and/or other data for evaluation to the cloud-based provisioning system at block 315.

At block 320, the cloud-based provisioning system may calculate PTK values using the received data and stored PMKs. The calculated PTKs can then be used to calculate MIC values. The calculated MIC values may be evaluated for a match with the received MIC at block 315 at least until a match is identified. If no match is identified, an error or rejection message may be transmitted back to the AP indicating that no valid PMK was located that matches the MIC received at block 315.

In a conventional arrangement, when the AP stores the single valid PSK, computing a single value (e.g., MIC) may be relatively easy. However, since the PSK used by the wireless device at block 310 is not known (since the PSK is not transmitted by the wireless device to the AP), a value (e.g., a MIC) needs to be calculated based on each stored PSK of the cloud-based provisioning system at least until a match is identified. To save processing time, each stored PSK may have its associated PMK pre-calculated and stored. For example, each PMK may be precalculated using a password-based key derivation function using the PSK as the password and the SSID of the wireless network as the salt. In some embodiments, the function may be iterated 4096 times. For each PMK, a PTK may be calculated using information received from the AP, such as the SNonce. At block 325, a match may be identified. A match is determined to be present when a MIC calculated based on a stored PSK (or pre-calculated PMK) matches the MIC received from the AP. In other embodiments, a value other than a MIC may be used to determine whether a match is present.

The stored PSK that was used to generate the PMK and MIC that matched the received MIC from the AP is provided to the AP at block 330. Alternatively or additionally, the PMK calculated by the cloud-based provisioning system may be provided. The PSK/SSID (or pre-calculated PMK) can then be used by the AP to complete the handshaking process with the wireless device and provide network access. Data that is stored in the wireless network access profile mapped to the PSK may be used to restrict network access or attach additional conditions, such as the need for terms of service to be agreed to, the amount of bandwidth provided, the total amount of data that is permitted to be uploaded or download, temporal restrictions, and/or whether an additional layer of security, such as conformation of a unique identifier of the user, needs to be performed before network access is granted via the AP and/or other devices that are used to prepare the connection and/or grant access.

At block 335, the provisioning process may be completed and network access based at least in part on the unique PSK is provided to the wireless device. For instance, the network access may be used to access the Internet. In other embodiments, access may be used to grant access to another network, such as an intranet, corporate LAN, etc. In some embodiments, the provisioning process may be used to restrict access to a network. For instance, for a particular device or type of devices (that have been mapped to a particular PSK), the level of access granted to a wireless network may be restricted. For instance, a device may be given intranet access but may not be permitted to access the Internet via the intranet.

Figure 4A:
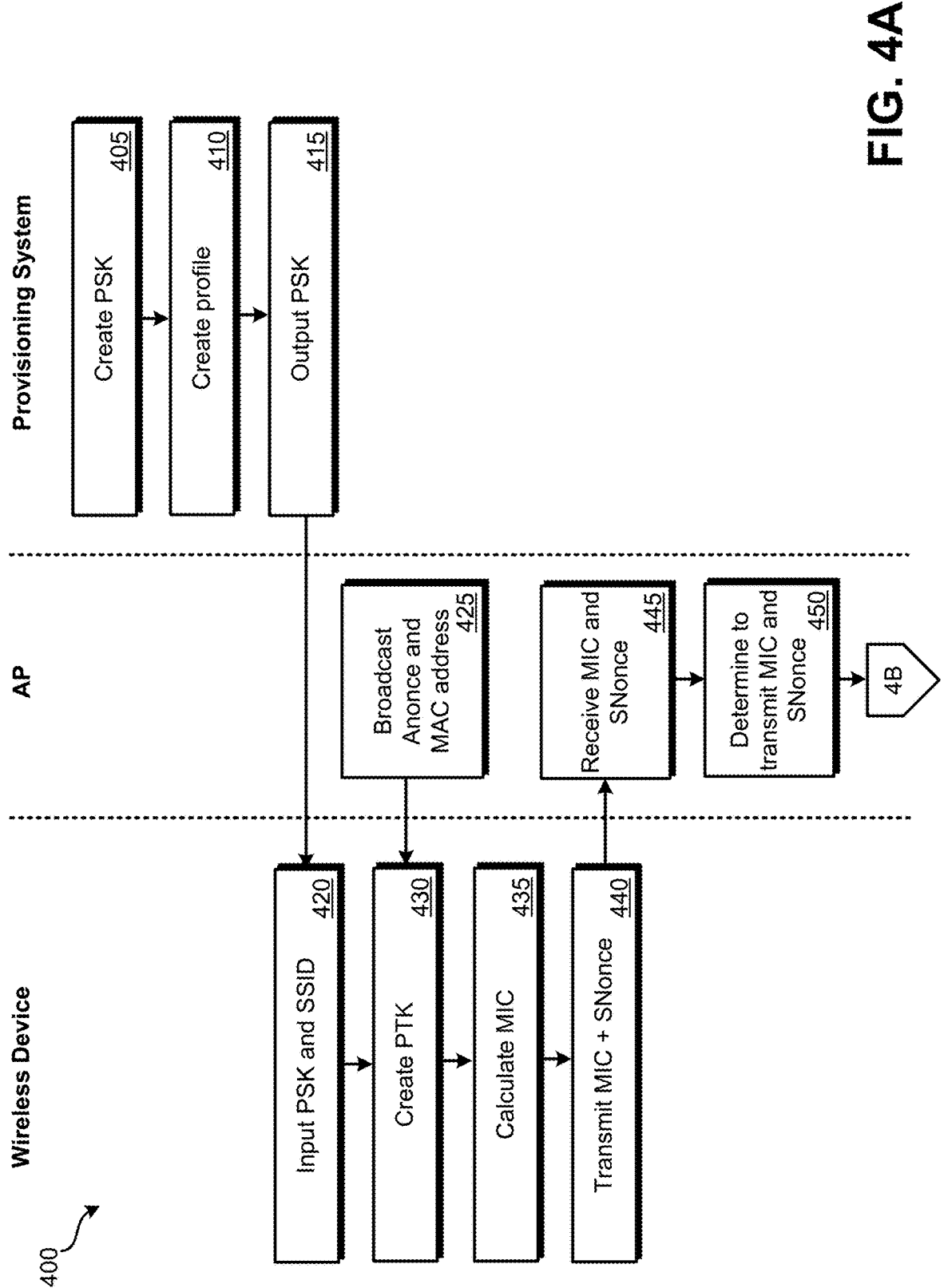

FIGS. 4A and 4B illustrate an embodiment of a method 400 for wireless network provisioning using a pre-shared key. Method 400 can represent a more detailed embodiment of method 300. Method 400 may be performed using system 100, system 200, or some other form of system that allows for wireless network provisioning using a PSK. In method 400, the wireless device could be, for example, wireless device 150, 152, 154, or 156 of FIGS. 1 and 2. The AP may be AP 140 or 142 of FIGS. 1 and 2. The provisioning system can include: cloud-based provisioning system 110; PMK database 112; profile database 114; and registration system 120.

At block 405, a unique PSK may be generated. The PSK may be generated due to a new user or user group being identified that is to receive network access. The unique PSK may be randomly generated and may be checked to ensure it does not match any other PSK associated with a wireless network access profile. The unique PSK may be created using cloud-based provisioning system 110, registration system 120, or some other computerized component that can access profile database 114. At block 410, a wireless network access profile may be created using the PSK. The unique PSK may be created and stored in a profile database of a cloud-based provisioning system. The profile created at block 410 may store various pieces of information related to the PSK, such as the related network's SSID, information about the user, whether terms of service have been accepted by the user, an identifier of the user, etc. At block 415, the PSK, possibly along with other pertinent information (e.g., a network SSID), may be provided to a user via any of the arrangements previously disclosed such that the user can input the unique PSK to connect with a wireless network.

At block 420, the PSK, possibly along with other information, can be provided to the wireless device that is to access the wireless network. A user may access a network configuration interface and select or input the correct SSID. The user may then be prompted to input the PSK. If the wireless device is an IoT device that does not have a user interface that permits the direct input of data, the user may execute an application on another computerized device. This other computerized device may transfer the SSID and PSK to the IoT device for use in connecting with the AP.

At block 425, the AP may broadcast data advertising itself. The broadcast data may include its SSID, ANonce, and/or MAC address. In some embodiments, the SSID is hidden and must already be known. At block 430, using the PSK, SNonce, ANonce, AP MAC address, and wireless device MAC address, a concatenated string of data may be created. A pseudorandom function may be used to generate a PTK at block 430 by the wireless device. The PTK may then be used to calculate a MIC at block 435. The MIC, SNonce, Station MAC address, and/or EAPoL frame may be transmitted to the AP at block 440. Notably the PSK and PMK is not transmitted to the AP.

The AP, on receiving the MIC and SNonce (and/or PTK) may determine that communication with the provisioning system is needed to determine whether access to be granted to the wireless device at block 450. In some embodiments, the AP may be able to handle multiple PSKs. A first PSK may be stored locally and authentication can be performed with the wireless device without communicating with the provisioning system. One or more remotely stored PSKs may require that the PSK be retrieved from the provisioning system. If the MIC received at block 445 does not match a MIC calculated locally by the AP based on the received information (e.g., PTK, SNonce, MAC address, etc.) and the locally-stored PSK, the determination may be made to pass the AP MAC address, device MAC address, ANonce packet provided by the access point to the network-enabled device, the SNonce packet provided by the network-enabled device to the access point, and the entire EAPoL Key Frame to the provisioning system.

Method 400 continues on FIG. 4B. At block 455, the AP may transmit the AP MAC address, the network-enabled device MAC address, the ANonce packet provided by the AP to the network-enabled device, the SNonce packet provided by the network-enabled device to the AP, and/or the entire EAPol key frame to the provisioning system. Transmission may occur via the Internet or some other network. In other embodiments, the provisioning system may be local to the AP. At block 460, the AP MAC address, the network-enabled device MAC address, the ANonce packet provided by the AP to the network-enabled device, the SNonce packet provided by the network-enabled device to the AP, and/or the entire EAPoL key frame may be received by the provisioning system. In some embodiments, additional data may be sent, such as SNonce, AP MAC address, and/or wireless device MAC address.

At blocks 465-480, the provisioning system attempts to calculate a MIC based on the received information using PSKs stored by the profile database. At block 465, using the received information along with other data obtained from the AP, such as SNonce, AP MAC address, the wireless device MAC address, the provisioning system may calculate a first PTK value. The PTK value, just as constructed by the wireless device, may be determined by creating a concatenated string of values then applying a pseudorandom function to obtain the PTK. At block 470, a MIC may then be calculated for the PTK. At block 475, a determination is made as to whether the calculated MIC matches the MIC received at block 460. If there is a match, method 400 may proceed to block 480. If there is no match, method 400 can return to block 465 and perform the calculation for the next PSK stored in the profile database. If no match is identified after calculating a MIC for every PMK in the database, an error message may be sent by the provisioning system to the AP and no network access may be granted to the wireless device.

At block 482, the wireless device's MAC address (or some other form of identifier of the wireless device) may be stored and mapped to the determined correct PMK, which can be used when the method is performed in the future to avoid having to recalculate MICs for many PMKs to identify a match. Rather, if a device having the MAC address attempts to access the wireless network again, the PMK mapped to the MAC address may be the first PMK used to calculate a MIC value to determine if a match is present.

At block 480, when a match between the stored and calculated MIC is identified, the PMK that resulted in the match is transmitted to the AP. The AP may receive the PMK at block 485. Using the PMK, the AP can establish an encrypted communication session with the wireless device and grant network (e.g., Internet) access to the wireless device at block 490. As previously detailed, in some embodiments, additional data may be collected from the wireless device before access is granted based on data stored in the profile having the matching PMK. For instance, a user may be required to provide an identifier (e.g., username, email address, loyalty number) that matches a stored identifier in the profile and/or the user may be required to accept a set of terms of service provided to the wireless device (or provided to a related wireless device). At block 495, the wireless device obtains network access through the AP. At block 499, the profile from which the PMK was obtained may be updated to include data about the wireless device that has successfully connected (e.g., that the wireless device has assented to terms of service, the MAC address of the wireless device, etc.)

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for wireless network provisioning using a pre-shared key (PSK), the method comprising:
   creating, at a cloud-based provisioning system, a plurality of wireless network access profiles that indicate: 1) a plurality of PSKs; 2) a plurality of bandwidth restrictions; and 3) a plurality of time periods for which network access is permitted, wherein the cloud-based provisioning system is an internet-connected server system distinct from a plurality of access points that are in communication with the cloud-based provisioning system;
   receiving, by an access point of the plurality of access points, from a wireless device, a first value that is based at least in part on the PSK;
   transmitting, by the access point, the first value to the cloud-based provisioning system via the Internet;
   creating, by the cloud-based provisioning system, a plurality of values based on the plurality of PSKs of the plurality of wireless network access profiles;
   identifying, by the cloud-based provisioning system a second value of the plurality of values that matches the transmitted first value;
   providing, by the cloud-based provisioning system to the access point via the Internet, a pairwise master key (PMK) based on the PSK of the wireless network access profile of the plurality of wireless network access profiles used to generate the second value that matches the transmitted first value; and
   providing, by the access point, network access to the wireless device using the PMK received from the cloud-based provisioning system for a time period indicated by the wireless network access profile used to generate the second value that matches the transmitted first value in accordance with a bandwidth restriction of the plurality of bandwidth restrictions mapped to the PSK in the wireless profile stored by the cloud-based provisioning system.

2. The method for wireless network provisioning using the PSK of claim 1, wherein Internet access is granted to the wireless device during a time period defined by the wireless network access profile.

3. The method for wireless network provisioning using the PSK of claim 1, wherein the first value is a message integrity code (MIC).

4. The method for wireless network provisioning using the PSK of claim 1, further comprising:
   transmitting, by the access point, an ANonce value and an SNonce value to the cloud-based provisioning system.

5. The method for wireless network provisioning using the PSK of claim 4, further comprising:
   transmitting, by the access point, a MAC address for the wireless device to the cloud-based provisioning system.

6. The method for wireless network provisioning using the PSK of claim 1, wherein the PSK is never transmitted between the wireless device and the access point.

7. The method for wireless network provisioning using the PSK of claim 1, further comprising:
   requesting a unique identifier from the wireless device;
   receiving the unique identifier from the wireless device; and
   comparing, by the cloud-based provisioning system, the unique identifier to a stored unique identifier that is part of the wireless network access profile, wherein providing Internet access is conditional on the unique identifier matching the stored unique identifier.

8. A system for wireless network provisioning, the system comprising:
   an access point that provides wireless devices with Internet access and is configured to receive a first value from a wireless device that is based at least in part on a pre-shared key (PSK) and a plurality of time periods for which network access is permitted; and
   a cloud-based provisioning system that communicates with the access point, wherein the cloud-based provisioning system is an internet-connected server system, the cloud-based provisioning system configured to:

create a plurality of wireless network access profiles that indicate a plurality of PSKs and a plurality of bandwidth restrictions;

receive the first value from the access point via the Internet;

create a plurality of values based on the plurality of PSKs of the plurality of wireless network access profiles;

identify a second value of the plurality of values that matches the received first value; and transmit, to the access point via the Internet, a pairwise master key (PMK) based on the PSK of the wireless network access profile of the plurality of wireless network access profiles used to generate the second value that matches the transmitted first value, wherein:

the PMK is used to provide network access to the wireless device for a time period indicated by the wireless network access profile used to generate the second value that matches the transmitted first value; and bandwidth for the wireless device is restricted based on a bandwidth restriction of the plurality of bandwidth restrictions mapped to the PSK in the wireless network access profile.

9. The system for wireless network provisioning of claim 8, wherein the access point is configured to provide network access based on the PMK.

10. The system for wireless network provisioning of claim 8, wherein Internet access is granted to the wireless device during a time period defined by the wireless network access profile.

11. The system for wireless network provisioning of claim 8, wherein the first value is a message integrity code (MIC).

12. The system for wireless network provisioning of claim 8, wherein the access point is further configured to transmit an ANonce value and an SNonce value to the cloud-based provisioning system, wherein the SNonce value is received by the access point from the wireless device.

13. The system for wireless network provisioning of claim 12, wherein the system further comprises the wireless device.

14. The system for wireless network provisioning of claim 12, wherein the system further comprises a second access point that provides wireless devices with Internet access.

15. The system for wireless network provisioning of claim 8, wherein the PSK is never transmitted between the wireless device and the access point.

16. The system for wireless network provisioning of claim 8, wherein the cloud-based provisioning system is further configured to:

determine, based on the wireless network access profile, that the wireless device is the first wireless device to access the wireless network is association with the wireless network access profile; and provide, via the access point, terms of service to the wireless device for presentation based on determining that the wireless device is the first wireless device to access the wireless network in association with the wireless network access profile.

17. The system for wireless network provisioning of claim 8, wherein the cloud-based provisioning system is further configured to:

request, via the access point, a unique identifier from the wireless device;

receive, via the access point, the unique identifier from the wireless device; and compare the unique identifier to a stored unique identifier that is part of the wireless network access profile, wherein providing Internet access is conditional on the unique identifier matching the stored unique identifier.

18. The method for wireless network provisioning using the PSK of claim 1, further comprising:

determining, by the cloud-based provisioning system, that the wireless network access profile used to generate the second value that matches the first value is being used for a first time based upon an indication stored as part of the wireless network access profile;

in response to determining that the wireless network access profile used to generate the second value that matches the first transmitted first value is being used for the first time, cause terms of service to be presented by the wireless device, wherein providing the network access to the wireless device using the PMK is performed based on receiving assent to the terms of service presented by the wireless device; and in response to receiving the assent to the terms of service presented by the wireless device, modify, by the cloud-based provisioning system, the indication stored as part of the wireless network access profile to indicate the terms of service have been accepted such that the terms of service are not presented again at another wireless device that reuses the PSK of the wireless network profile.

* * * * *